United States Patent
Marker et al.

(10) Patent No.: US 7,994,375 B2
(45) Date of Patent: Aug. 9, 2011

(54) PRODUCTION OF GASOLINE, DIESEL, NAPHTHENES AND AROMATICS FROM LIGNIN AND CELLULOSIC WASTE BY ONE STEP HYDROCRACKING

(75) Inventors: Terry L. Marker, Palos Heights, IL (US); John A. Petri, Palatine, IL (US)

(73) Assignee: UOP LLC, Des Plaines, IL (US)

( * ) Notice: Subject to any disclaimer, the term of this patent is extended or adjusted under 35 U.S.C. 154(b) by 750 days.

(21) Appl. No.: 11/535,274

(22) Filed: Sep. 26, 2006

(65) Prior Publication Data
US 2008/0076945 A1    Mar. 27, 2008

(51) Int. Cl.
*C10G 1/00*    (2006.01)
(52) U.S. Cl. ........ 585/240; 585/242; 585/265; 208/409; 208/419; 208/421; 208/433
(58) Field of Classification Search ................. 208/409, 208/419, 421, 422, 423, 433; 585/240, 242, 585/265
See application file for complete search history.

(56) References Cited

U.S. PATENT DOCUMENTS

| | | | | |
|---|---|---|---|---|
| 4,234,407 A | * | 11/1980 | Duncan et al. | 208/408 |
| 4,420,644 A | * | 12/1983 | Huibers et al. | 568/806 |
| 4,647,704 A | * | 3/1987 | Engel et al. | 568/716 |
| 5,605,551 A | * | 2/1997 | Scott et al. | 44/307 |
| 5,616,154 A | | 4/1997 | Elliott et al. | 48/197 R |
| 5,705,722 A | * | 1/1998 | Monnier et al. | 585/240 |
| 5,959,167 A | | 9/1999 | Shabtai et al. | 585/242 |
| 6,043,392 A | | 3/2000 | Holtzapple et al. | 562/513 |
| 6,139,723 A | * | 10/2000 | Pelrine et al. | 208/422 |
| 6,172,272 B1 | * | 1/2001 | Shabtai et al. | 585/242 |
| 6,676,716 B2 | | 1/2004 | Fujimura et al. | 48/197 FM |
| 7,090,013 B2 | | 8/2006 | Wellington | 166/267 |
| 7,578,927 B2 | * | 8/2009 | Marker et al. | 208/67 |

* cited by examiner

*Primary Examiner* — N. Bhat
(74) *Attorney, Agent, or Firm* — Arthur E Gooding

(57) ABSTRACT

A process for the conversion of biomass to a liquid fuel is presented. The process includes the production of diesel and naphtha boiling point range fuels by hydrotreating and hydrocracking of lignin in the biomass in a one step process.

12 Claims, 1 Drawing Sheet

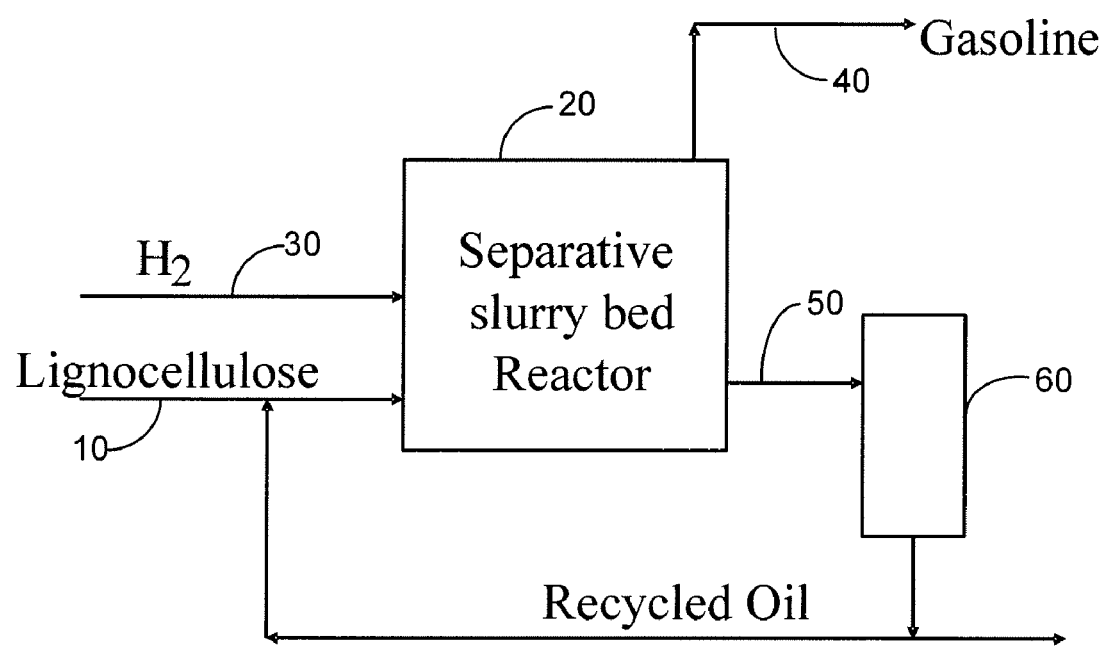
FIGURE

PRODUCTION OF GASOLINE, DIESEL, NAPHTHENES AND AROMATICS FROM LIGNIN AND CELLULOSIC WASTE BY ONE STEP HYDROCRACKING

FIELD OF THE INVENTION

This invention relates to processes for obtaining hydrocarbons from biomass. More particularly, this invention relates to the treatment of lignin and cellulosic waste to produce an aromatic rich naphtha useful in gasoline and diesel fuels.

BACKGROUND OF THE INVENTION

Renewable energy sources are of increasing importance. They are a means of reducing dependence on imported oil and provide a substitute for fossil fuels. Also, renewable resources can provide for basic chemical constituents to be used in other industries, such as chemical monomers for the making of plastics. Biomass is a renewable resource that can provide some of the needs for sources of chemicals and fuels.

Biomass includes, but is not limited to, plant parts, fruits, vegetables, plant processing waste, wood chips, chaff, grain, grasses, corn, corn husks, weeds, aquatic plants, hay, paper, paper products, recycled paper and paper products, and any cellulose containing biological material or material of biological origin. The economics depend on the ability to produce large amounts of biomass on marginal land, or in a water environment where there are few or no other significantly competing economic uses of that land or water environment. In addition, the economics can also depend on the disposal of biomass that would normally be placed in a landfill, thereby creating some offsetting savings.

The growing, harvesting and processing of biomass in a water environment provides a space where there is plenty of sunlight and nutrients while not detracting from more productive alternate uses. In addition, biomass contributes to the removal of carbon dioxide from the atmosphere as the biomass grows. The use of biomass can be one process for recycling atmospheric carbon while producing fuels and chemical precursors. Biomass when heated in an environment with low or no oxygen will generate a liquid product known as pyrolysis oil.

It is difficult and uneconomical to use pyrolysis oil directly. It would be useful to extract fuels without having to pyrolyze the biomass through new and improved processes and make fuels that work with engines that are currently distributed around the world without requiring upgrades to those engines.

SUMMARY OF THE INVENTION

The invention provides a process for producing high yields of naphtha and diesel related products from biomass. The biomass is mixed with a fluid to form a slurry. The slurry is contacted with a catalyst under a hydrogen rich atmosphere at reaction conditions thereby generating a reaction mixture stream. The reaction mixture stream comprises hydrocarbon liquids in the naphtha boiling range and diesel boiling range. The reaction is carried out at mild hydrocracking and mild hydrotreating conditions wherein the temperature of the reactor is from about 300° C. and 450° C. and under pressure from about 3.4 MPa (500 psig) to about 14 MPa (2000 psig).

Other objects, advantages and applications of the present invention will become apparent to those skilled in the art after a detailed description of the invention.

BRIEF DESCRIPTION OF THE DRAWING

The FIGURE is a schematic of the process for the present invention.

DETAILED DESCRIPTION OF THE INVENTION

In general, the treatment of biomass for energy purposes comprises heating, or cooking, the biomass to generate a gas, or liquid, that is subsequently treated to be useable as a fuel. The heating, or pyrolysis of the biomass generates a pyrolysis product which can be subsequently processed. The heating is in an atmosphere with little or no oxygen to prevent combustion and the purpose of this pyrolysis is to breakdown larger molecules. The conditions under which pyrolysis oil is formed may also favor condensation reactions, forming multi-ring aromatics and coke, as well as producing a product with a high water content. The multi-ring aromatics are difficult to process and the coke represents a loss of liquid yield. Other methods of processing biomasses include partial combustion to produce a gas often rich in carbon dioxide and carbon monoxide for subsequent processing.

The direct conversion of lignin to aromatics and naphthenes in a single step is a better process because it avoids thermal degradation reactions. The thermal degradation reactions can lead to condensed ring aromatics and polymers which are undesirable components for gasoline or diesel fuels. This process directly cracks the lignin in the cellulosic waste without having to undergo pyrolysis first and subsequent separation of the pyrolytic lignin from the other pyrolysis products.

An advantage with the process of the invention is there is no need to pyrolyze the cellulosic waste before processing. This saves on the building of a pyrolysis unit, and will produce products almost exclusively in the naphtha boiling point ranges, which is a preferred product based on cellulosic waste's molecular structure.

The invention comprises mixing the cellulosic waste, or lignin, with a fluid carrier to form a slurry. The fluid is used to help suspend the lignin and facilitate contact between the lignin and a catalyst. It is preferred that the fluid will wet the catalyst and help carry the lignin, or portions of the lignin into catalyst pores and be a good carrier for hydrogen for the process' reaction. The process, as shown in the FIGURE, has the slurry 10 passed to a reactor 20 and pressurized with a hydrogen containing gas 30. Preferably, the hydrogen containing gas is a hydrogen gas stream. The reaction mixture includes a catalyst, and produces naphtha boiling range fluids useful for mixing with gasoline or that will be further processed to increase the aromatics content of the naphtha boiling range fluids. The reactor 20 can be a slurry bed reactor, a fluidized bed reactor, or any reactor that facilitates contact between the lignin and the catalyst in the reactor. The naphtha boiling range fluids are separated from the reaction mixture to produce a product stream 40 and a recycle stream 50. The product stream 40 can be drawn off as a vapor and condensed. The product stream 40 comprises naphtha range products to be condensed, as well as CO, $CO_2$, water, and a hydrogen rich gas. The hydrogen rich gas can be recycled to the reactor 20. The recycle stream 50 can include catalyst that is carried out with the recycle oil. The recycle stream 50 can be treated to remove contaminants that build up in a treatment unit 60 before recycling the stream 50 to the reactor 20.

The slurry containing lignin is hydrotreated to decarboxylate and remove oxygen in the form of water from the lignin for partial cracking of the lignin molecules into smaller molecules comprising an aromatic ring or naphthene. Decarboxylation minimizes the hydrogen consumption during the breaking of the bonds holding the aromatic units in the lignin molecules together. This also limits the amount of hydrogenation of the aromatic rings to naphthenes. The hydrotreating is operated at a hydrogen partial pressure from about 3.4 MPa (500 psig) to about 14 MPa (2000 psig), and preferably is operated at a hydrogen partial pressure from about 6.3 MPa (900 psig) to about 10 MPa (1500 psig), and more preferably from about 6.3 MPa (900 psig) and 7.6 MPa (1100 psig). This is lower than the normal operation pressures for hydrotreating in previous art applications, which is in the range from 14 MPa (2000 psia) to 21 MPa (3000 psia). Operating conditions for the reactor 20 further include operating at a temperature between about 300° C. and 450° C., and preferably at a temperature between about 340° C. and 400° C.

The reactor includes a catalyst having a cracking function. The catalyst base is zeolitic or amorphous silica-alumina catalyst or a combination of both with a metal deposited on the catalyst or catalysts. The catalyst includes at least one metal selected from nickel (Ni), chromium (Cr), molybdenum (Mo), and tungsten (W), cobalt (Co), rhodium (Rh), iridium (Ir), ruthenium (Ru), rhenium (Re), platinum (Pt), and palladium (Pd). In one embodiment, the catalyst includes a mixture of the metals Ni and Mo on the catalyst. The catalyst is preferably a large pore catalyst that provides sufficient pore size for allowing larger molecules into the pores for cracking to smaller molecular constituents. The metal content deposited on the catalysts used are deposited in amounts ranging from 0.1 wt. % to 20 wt. %, with preferred values for the metals including, but not limited to, nickel in a range from 0.5 wt. % to 10 wt. %, tungsten in a range from 5 wt. % to 20 wt. %, and molybdenum in a range from 5 wt. % to 20 wt. %. The metals can also be deposited in combinations on the catalysts with preferred combinations being Ni with W, and Ni with Mo.

Zeolites used for the catalysts include, but are not limited to, beta zeolite, Y-zeolite, MFI type zeolites, mordenite, silicalite, SM3, and faujasite. Catalysts that are useable in this invention include hydrocracking catalysts, hydrotreating catalysts, and mixtures of hydrocracking and hydrotreating catalysts.

One of the problems with pyrolyzing the biomass before hydrotreating, or separating for further processing, is the increased yield loss due to coke formation. As shown in Table 1, when the biomass is first pyrolyzed then processed, up to 30% of the lignin is lost to coke formation. In addition, the processing requires operation at a higher temperature.

TABLE 1

Pyrolysis vs. Hydrocracking

| | Pyrolysis | Hydrocracking |
|---|---|---|
| Temperature, C. | 480-510 | 400-455 |
| Pressure, MPa | 0.24 | 3.4-11 |
| Atmosphere | Inert | Hydrogen rich |
| Catalyst | None | NiMo |
| Yield loss to coke, % | 30 | none |

Hydrocracking provides for a greater yield in converting biomass to hydrocarbon liquids.

EXAMPLES

Experiments were run to compare this invention's performance against direct cellulose conversion. A slurry comprising tall oil or hydrotreated pyrolysis oil, which acts as the carrier oil, was formed with lignin or cellulose. The slurry was contacted with a NiMo hydrocracking/hydrotreating catalyst under a hydrogen atmosphere in an autoclave reactor. The catalyst is a commercial catalyst that comprises an amorphous silica-alumina catalyst with Ni and Mo. The experiment was run at a temperature of 400° C., a pressure of 11.3 MPa (1625 psi), and a LHSV of 0.75. The process had a hydrocarbon liquid yield of 40% to 50% with 98% of the oxygen removed. The resulting naphtha boiling range liquid had an oxygen content of 0.5%. This is a high hydrocarbon liquid yield with a high value having a significant concentration of naphtha boiling range liquids.

Further testing was performed using an autoclave on cellulosic materials that had not been treated to pyrolysis. The tests were carried out at pressures of 10.4 MPa (1500 psig) and 11.5 MPa (1650 psig), and at temperatures from 350° C. to 400° C. The catalyst to feed ratio was 1:3 and the LHSV was from 0.75 to 1.5. The autoclave was run from 2 to 4 hours for each test. The tests used either pyrolysis oil or tall oil to form a slurry with the solid lignin.

The results indicated significant light liquids in the naphtha boiling range with a low amount of diesel boiling range materials. Tests were run using different liquids for fluidizing the lignin. In one set of runs, tall oil, also known as liquid rosin, was used, in a 50:50 mixture of tall oil and dry lignin. The yields are shown in Table 2. From the test runs it was computed that about 21% of the lignin on a dry basis was converted to light liquids. The light liquids are liquids in the naphtha boiling range.

TABLE 2

Hydrotreating/hydrocracking yields of lignin in tall oil

| Test | Run 1 | Run 2 | By diff wet lignin | By diff. dry lignin |
|---|---|---|---|---|
| FEED | 50:50 Lignin:Tall Oil | 100% Tall Oil | Calculated Lignin Conversion | Calculated Lignin Conversion |
| Water, % of feed | 34.5 | 5.4 | 63.6 | 5.4 |
| Light liquids, % | 11.22 | 12 | 10.44 | 21.5 |
| Diesel | 24.6 | 58.6 | | |
| Gas and lt. HCs | 29.68 | 24 | 26.0 | 73.1 |
| Calc. CO and $CO_2$ | n/a | 15.2 | | |
| Lt. HC and loss calc. | n/a | 5.8 | | |
| % O in liq. Prod. | .48 | .5 | | |
| % O removal | n/a | 96.1 | | |

Further experiments were performed using a different oil for contacting the lignin with the catalyst. In a series of tests, dry lignin was carried into the reactor in a lightly treated pyrolysis oil, with the weight fraction of lignin as 40% of the feed. The yields are shown in Table 3. Using the pyrolysis oil, about 73% of the lignin on a dry basis was converted to light liquids. The removal of oxygen from the dry lignin was greater than 90% affording a high quality product with low oxygen content and relatively high cyclic content, or aromatics and naphthenes.

TABLE 3

Hydrotreating/hydrocracking yields of lignin in lightly treated pyrolysis oil

| Products | Run 1 | Run 2 | Run 3 | By diff. Wet lignin | By diff. dry lignin |
|---|---|---|---|---|---|
| Feed | 60/40 HT pyrolysis oil:lignin | 60/40 HT pyrolysis oil:lignin | 100% Hydrotreated Pyrolysis oil | | |
| Temperature | 350 | 400 | 400 | | |
| Water, % of feed | 32.3 | 34 | 14 | 64 | 3 |
| Light liquids, % | 23.2 | 28.3 | 28.2 | 28.45 | 73 |
| Diesel | 20.8 | 11.3 | 25.8 | 0 | |
| Gas and lt. HCs | 23.7 | 26.4 | 32 | 7.6 | 24 |
| Calc. CO and $CO_2$ | 0 | 0 | 10.4 | | |
| Lt. HC and loss calc. | 23.7 | 26.4 | 21.6 | | |
| % O in naphtha | 2.8 | 2.1 | .87 | | |
| % O in diesel | .08 | <.03 | n/a | | |
| % O removal | n/a | n/a | 98 | | |

The $CO_2$ and the CO yields are based on atomic oxygen balance based on the feed oxygen content and the amount of water collected in the products. The hydrogen consumption is calculated based on the feed and products hydrogen content.

While the invention has been described with what are presently considered the preferred embodiments, it is to be understood that the invention is not limited to the disclosed embodiments, but it is intended to cover various modifications and equivalent arrangements included within the scope of the appended claims.

What is claimed is:

1. A process for treating lignin or cellulosic waste consisting of:
    mixing the lignin or cellulosic waste with a liquid carrier forming a slurry; and
    contacting the slurry, in a single catalytic step, over a hydrotreating catalyst pressurized under hydrogen at reaction conditions to remove oxygen and partially saturate aromatic compounds derived from the deoxygenation process, thereby generating a product stream comprising primarily naphtha boiling range liquids wherein the product stream is substantially oxygen free, wherein the reaction conditions include a hydrogen partial pressure between 3.4 MPa (500 psig) and 14 MPa (2000 psig), and a temperature between 300° C. and 450° C.

2. The process of claim 1 wherein the hydrogen is at a partial pressure between about 6.2 MPa (900 psig) and 7.6 MPa (1100 psig).

3. The process of claim 1 wherein the reaction conditions include reacting at a temperature between about 350° C. to about 400° C.

4. The process of claim 1 wherein the product stream is drawn off as a vapor.

5. The process of claim 1 further comprising passing the reaction mixture stream to a separation unit thereby generating a product stream comprising aromatic and naphthenic compounds and a recycle stream comprising slurry oil.

6. The process of claim 5 further comprising passing the recycle stream to a treatment unit thereby generating a recycle oil stream and an excess oil stream.

7. A process for treating lignin in cellulosic waste consisting of:
    fluidizing the cellulosic waste; and
    in a single step, reacting the lignin in the fluidized cellulosic waste over a hydrotreating catalyst under a hydrogen rich atmosphere thereby generating a product stream comprising hydrocarbons in the naphtha boiling range wherein the product stream is substantially oxygen free, wherein the reaction conditions include a hydrogen partial pressure between 6.2 MPa (900 psig) and 14 MPa (2000 psig), and a temperature between 300° C. and 450° C.

8. The process of claim 7 wherein the reaction is performed in an ebullated bed reactor.

9. The process of claim 7 wherein the hydrogen is at a partial pressure between about 6.2 MPa (900) psig and 7.6 MPa (1100 psig).

10. The process of claim 7 wherein the reaction is performed in a fluidized bed reactor.

11. The process of claim 7 further comprising passing the reaction mixture stream to a separation unit thereby generating a product stream comprising aromatic and naphthenic compounds and a recycle stream.

12. The process of claim 7 wherein the fluidizing material is a liquid comprising a hydrocarbon.

* * * * *